US012683434B2

(12) United States Patent
Pan et al.

(10) Patent No.: US 12,683,434 B2
(45) Date of Patent: Jul. 14, 2026

(54) VEHICLE-MOUNTED WIRELESS CHARGING SYSTEM

(71) Applicant: Transsemi Microelectronics Co., Ltd, Jiaxing (CN)

(72) Inventors: Jiankao Pan, Jiaxing (CN); Shunyang Ji, Jiaxing (CN); Lifeng Wang, Jiaxing (CN); Lin Zhou, Jiaxing (CN)

(73) Assignee: Transsemi Microelectronics Co., Ltd, Jiaxing (CN)

( * ) Notice: Subject to any disclaimer, the term of this patent is extended or adjusted under 35 U.S.C. 154(b) by 0 days.

(21) Appl. No.: 18/974,997

(22) Filed: Dec. 10, 2024

(65) Prior Publication Data

US 2025/0105672 A1      Mar. 27, 2025

(30) Foreign Application Priority Data

Dec. 11, 2023    (CN) ......................... 202311687625.5

(51) Int. Cl.
| | |
|---|---|
| *H02J 50/12* | (2016.01) |
| *H01F 27/28* | (2006.01) |
| *H02J 50/40* | (2016.01) |

(52) U.S. Cl.
CPC .............. *H02J 50/12* (2016.02); *H01F 27/28* (2013.01); *H02J 50/402* (2020.01)

(58) Field of Classification Search
CPC ......... H02J 50/10–12; H02J 50/40–402; H02J 50/80; H02J 7/00032–00045
See application file for complete search history.

(56) References Cited

U.S. PATENT DOCUMENTS

| | | | | |
|---|---|---|---|---|
| 2014/0354223 A1* | 12/2014 | Lee | ........................ | H02J 50/12 |
| | | | | 320/108 |
| 2015/0061586 A1* | 3/2015 | Cheikh | ................. | H02J 50/402 |
| | | | | 320/108 |

(Continued)

FOREIGN PATENT DOCUMENTS

| | | |
|---|---|---|
| CN | 110492621 A | 11/2019 |
| CN | 210327062 U | 4/2020 |

(Continued)

OTHER PUBLICATIONS

English machine translation of WO2015140917A1 published Sep. 24, 2015 (Year: 2015).*

(Continued)

*Primary Examiner* — Rexford N Barnie
*Assistant Examiner* — David A Shiao
(74) *Attorney, Agent, or Firm* — Hemisphere Law, PLLC

(57)        ABSTRACT

A novel vehicle-mounted wireless charging system is disclosed, which includes a transmitter. The transmitter includes a full-bridge unit, a compensating unit, a transmitting unit and a selecting unit. The full-bridge unit consists of one or two full-bridge modules, the compensating unit consists of two or more compensating network modules, the transmitting unit consists of multiple transmitting coils, and the selecting unit is used for switching different coils. Two full-bridge modules, two compensating network modules and multiple transmitting coils form a first mode, different full-bridge modules are selected to charge different models of mobile phones by switching through the selecting unit; one full-bridge modules, two groups of compensating network modules and multiple transmitting coils form a second mode, different compensating network modules are selected to charge different models of mobile phones by switching through the selecting unit.

8 Claims, 6 Drawing Sheets

(56)          References Cited

U.S. PATENT DOCUMENTS

| | | | |
|---|---|---|---|
| 2016/0264007 A1 | 9/2016 | Haase | |
| 2019/0248251 A1 | 8/2019 | Park | |
| 2020/0290467 A1 | 9/2020 | Gao et al. | |
| 2020/0312545 A1* | 10/2020 | Uchimoto | H01F 38/14 |
| 2022/0149646 A1* | 5/2022 | Yang | H01F 38/14 |
| 2023/0246486 A1* | 8/2023 | Li | H02M 7/4815 |
| 2024/0055900 A1* | 2/2024 | Sherman | H02J 50/005 |
| 2024/0195222 A1* | 6/2024 | Sieklik | H02J 7/0044 |

FOREIGN PATENT DOCUMENTS

| | | | | |
|---|---|---|---|---|
| CN | 217183041 U | 8/2022 | | |
| WO | WO-2015140917 A1 * | 9/2015 | | H02J 50/70 |
| WO | WO-2019195882 A1 * | 10/2019 | | H02J 50/90 |
| WO | WO-2024191211 A1 * | 9/2024 | | H01F 7/02 |

OTHER PUBLICATIONS

English machine translation of WO2024191211A1 published Sep. 19, 2024 (Year: 2024).*

* cited by examiner

VEHICLE-MOUNTED WIRELESS CHARGING SYSTEM

TECHNICAL FIELD

The disclosure relates to the technical field of wireless charging, in particular to a novel vehicle-mounted wireless charging system.

BACKGROUND ART

With the development of wireless charging, the Wireless Power Consortium (WPC) resets the Qi 2.0 standard according to the existing Magsafe magnetic type wireless charging standard of Apple. Compared with the EPP protocol standard specified by Qi 1.3 which operates at a frequency of 100 kHz-200 kHz, the MPP standard specified by Qi 2.0 sets the frequency of the transmitting coil to 360 kHz, resulting in a significant difference in operating frequency, so that a scheme for realizing 50 W proprietary protocol quick charging and 15 W Apple magnetic type wireless charging simultaneously is not available on the market at present.

Based on this phenomenon, the present disclosure proposes a scheme, which combines two kinds of different coils to realize 50 W proprietary protocol quick charging and Apple 15 W wireless quick charging.

SUMMARY

Aiming at the defects existing in the prior art, the disclosure provides a vehicle-mounted wireless charging system for solving the technical problems.

In order to achieve the above purpose, the present disclosure provides the following technical solutions:

A novel vehicle-mounted wireless charging system is provided, which includes a transmitter. The transmitter includes:

a full-bridge unit, used for inverting and modulating signals, and composed of one or two full-bridge modules, a compensating unit, used for compensating a transmitting coil and improving a power transmission efficiency, and composed of two or more compensating network modules which are composed of a combination of inductance and capacitance;

a transmitting unit, composed of multiple transmitting coils; and a selecting unit, used for switching different coils and compensating network modules, and composed of multiple switches;

two full-bridge modules, two compensating network modules and multiple transmitting coils form a first mode, different full-bridge modules are selected to charge different models of mobile phones by switching through the selecting unit;

one full-bridge module, two groups of compensating network modules and multiple transmitting coils form a second mode, the two groups of compensating network modules are parallel compensating network modules and series compensating network modules respectively, different compensating network modules are selected by switching through the selecting unit, and the compensating network impedance is changed to compensate different transmitting coils, for charging different models of mobile phones.

Further, the first mode is composed of two full-bridge modules, two compensating network modules, multiple switches, multiple EPP coils and an MPP coil;

the one full-bridge module, the one compensating network module, the multiple switches and the multiple EPP coils form a proprietary 50 W quick charging unit, the other full-bridge module, the other compensating network module and the MPP coil form an MPP 15 W quick charging unit, the proprietary 50 W quick charging unit and the MPP 15 W quick charging unit are independent from each other.

Further, the first mode may also be composed of two full-bridge modules, two compensating network modules, multiple first switches, two second switches, one third switch, and multiple transmitting coils, and the multiple first switches are connected in series with the multiple transmitting coils in one-to-one correspondence, the third switch is connected with one of the transmitting coils and the two second switches are connected with this transmitting coil, and the two second switches correspond to different turns of the coil respectively, one full-bridge module, one compensating network module, multiple first switches and multiple transmitting coils form an EPP quick charging unit, the other full-bridge module, the other compensating network module, the two second switches, the third switch and one of the transmitting coils form a MPP quick charging unit.

Further, the second mode is composed of one full-bridge module, one group of parallel compensating network modules, one group of series compensating network modules, multiple transmitting coils, multiple fourth switches, multiple fifth switches and multiple sixth switches, the group of parallel compensating network modules and the group of series compensating network modules each include multiple compensating networks, the multiple fourth switches are connected in series with the multiple transmitting coils in one-to-one correspondence, the fifth switches are connected with the parallel compensating network module, the sixth switches are connected with the series compensating network module, the transmitting coils can be compatible with EPP mode and MPP mode simultaneously, when the fifth switch and the sixth switch are not closed, the compensating network which is not controlled by the fifth switch and the sixth switch can compensate the coil, the corresponding coil is enabled to charge the mobile phone by selecting the fourth switch, which is an EPP quick charging unit;

when the fifth switch and the sixth switch are closed, the compensating network impedance is changed, the coil is compensated, the corresponding coil is enabled to charge the mobile phone by selecting the fourth switch, which is an MPP quick charging unit.

Further, the second mode may also be composed of one full-bridge module, one group of parallel compensating network modules, one group of series compensating network modules, an EPP coil, an MPP coil, a seventh switch, an eighth switch, multiple ninth switches, and multiple tenth switch, the group of parallel compensating network modules and the group of series compensating network modules each include multiple compensating networks, the seventh switch is connected in series with the EPP coil correspondingly, the eighth switch is connected in series with the MPP coil correspondingly, the ninth switches are connected with the parallel compensating network modules, the tenth switches are connected with the series compensating network modules, when the mobile phone is detected to be with EPP protocol, the seventh switch is selected to make the EPP coil charge the mobile phone, when the mobile phone is detected to be with MPP protocol, the eighth switch is closed to make the MPP coil charge the mobile phone, and meanwhile the ninth switch and the tenth switch are controlled to be closed to make the parallel compensating network modules and the series compensating network modules be used for compensating the MPP coil.

Further, the second mode may also be composed of one full-bridge module, one group of parallel compensating network modules, one group of series compensating network modules, multiple coils, multiple eleventh switches, two twelfth switches, multiple thirteenth switches and multiple fourteenth switches, the group of parallel compensating network modules and the group of series compensating network modules each include multiple compensating networks, the multiple eleventh switches are correspondingly connected in series with the multiple coils, the two twelfth switches respectively correspond to different turns of one of the coils, the thirteenth switch is connected with the parallel compensating network modules, the fourteenth network switch is connected with the series compensating network modules, when the mobile phone is detected to be with EPP protocol, one of the twelfth switches is closed, the eleventh switch is selected to make the corresponding coil charge the mobile phone, when the mobile phone is detected to be with MPP protocol, one of the coils is closed, the other twelfth switch corresponding to this coil is closed, and meanwhile, the ninth switches and the tenth switches are controlled to be closed, so that the parallel compensating network modules and the series compensating network modules are used for compensating the coils, and the coils charge the mobile phone.

Further, multiple the EPP coils are provided, multiple seventh switches are provided, and the EPP coils and the seventh switches are connected in series in a one-to-one correspondence.

Further, the MPP coil is a magnetic coil and the EPP coil is a Qi 1.3 standard coil.

By adopting the technical scheme, the disclosure has the beneficial effects that: compared with the existing scheme in the market, the disclosure integrates two different types of quick charging coils on one same charging equipment, which realizes proprietary 50 W quick charging (Huawei, Xiaomi, Oppo and the like) and Apple 15 W magnetic quick charging on the same vehicle-mounted wireless charger, has higher compatibility to a mobile phone of a client, and improves the charging experience of the client.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by persons of ordinary skill in the art based on the embodiments of the present disclosure without creative efforts shall belong to the scope of protection of the present disclosure.

In the description of the present disclosure, it should be understood that, orientation or position relationships indicated by terms such as "upper", "lower", "front", "rear", "left", "right", "top", "bottom", "inner", "outer" and the like are orientation or position relationships based on the accompanying drawings, which are only used to facilitate the description of the present disclosure and simplify the description, rather than indicating or implying that the device or element referred to must have a specific orientation, and be constructed and operated in a specific orientation, and therefore cannot be construed as a limitation to the present disclosure.

Figure 1:
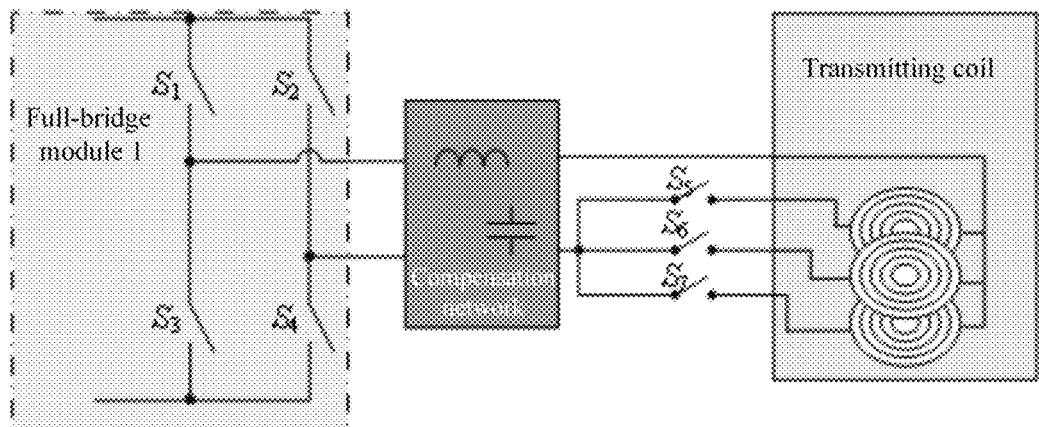
FIG. 1 is a schematic diagram of a basic circuit structure according to an embodiment of the disclosure.

As shown in FIG. 1, the TX part of the vehicle-mounted wireless charger is divided into three modules, namely a full-bridge unit, a compensating unit and a transmitting unit. The full-bridge unit is composed of a full-bridge module, and the full-bridge module is composed of four independent switches or an independent full bridge module is adopted, which is used for inverting and modulating signals; the compensating network unit is composed of compensating network modules, the compensating network modules can be divided into a series compensating network Cs and a parallel compensating network CP, each compensating network is composed of an inductor and a capacitor (which can be a single inductor or a single capacitor, or an element group formed by multiple inductors and capacitors in series-parallel connection), and the compensating network modules are used for compensating the transmitting coil and improving the power transmission efficiency; the transmitting unit is composed of transmission coils, and the transmitting coil is divided into an EPP transmission coil and an MPP transmission coil. S5-S7 are coil selection switches for switching different coils; the switch may be a transistor or a MOSFET.

Figure 2:
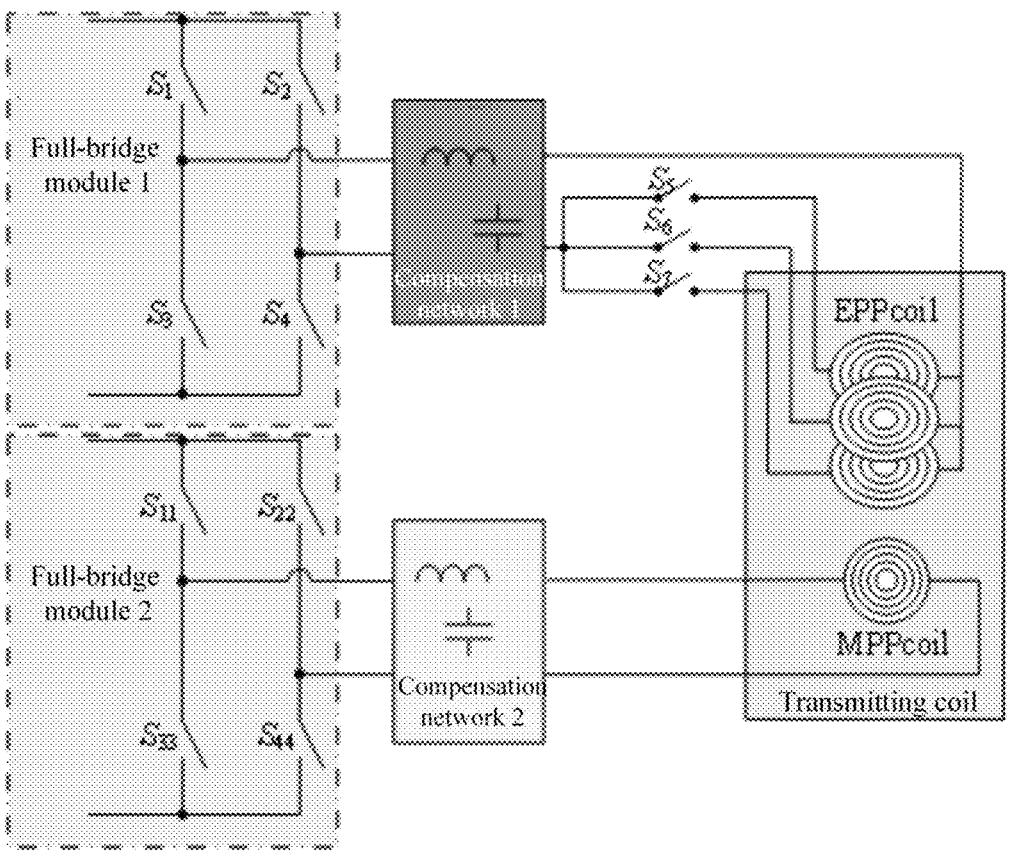
FIG. 2 is a schematic circuit diagram of a combination of the first mode according to an embodiment of the disclosure.

As shown in FIG. 2, in one combination mode of the first mode, the full-bridge module 1, the compensating network 1, the switches (S5, S6, S7) and the EPP coil form a proprietary 50 W quick charging unit; the full-bridge module 2, the compensating network module 2 and the MPP coil form an MPP 15 W quick charging unit;

corresponding to mobile phones with different protocols, the vehicle-mounted wireless charger selects different full-bridge modules to charge the mobile phones: for example, for a Huawei mobile phone, the proprietary 50 W quick charging unit is selected for charging; and for an Apple mobile phone, the MPP 15 W quick charging unit is selected.

Figure 3:
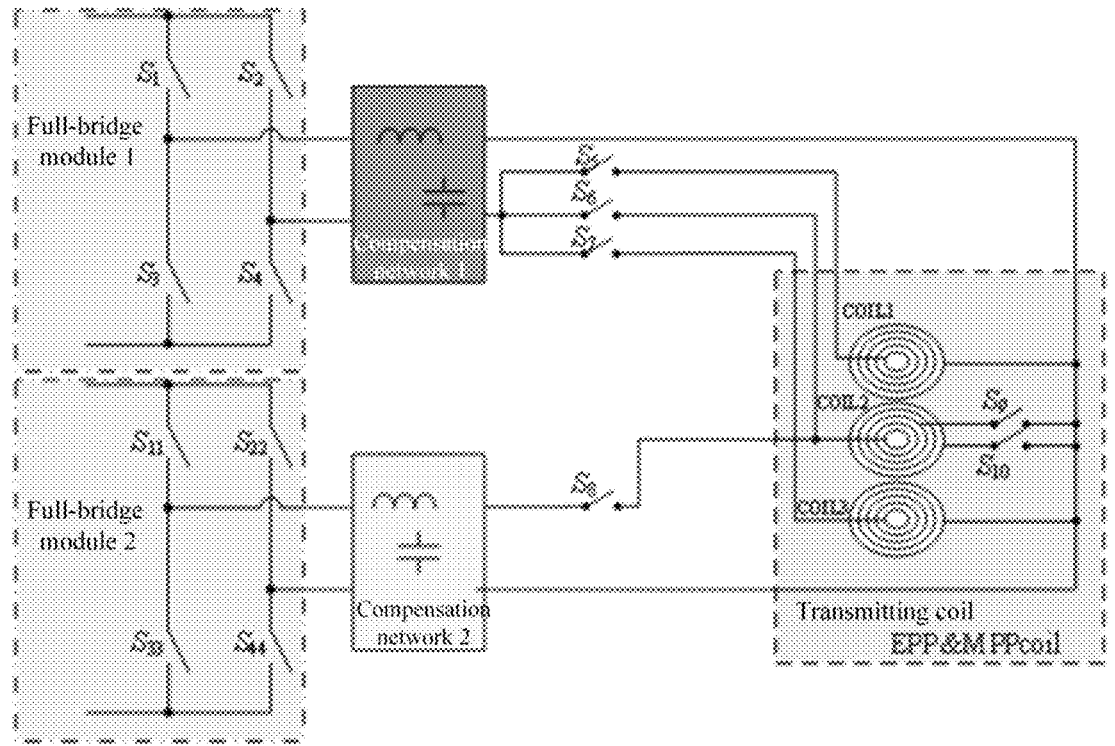
FIG. 3 is a schematic circuit diagram of another combination of the first mode according to an embodiment of the present disclosure.

As shown in FIG. 3, in another combination mode of the first mode, the full-bridge module 1 and the compensating network 1 are EPP inversion and compensating networks; the full-bridge module 2 and the compensating network module 2 are MPP inversion and compensating networks; first switches (S5, S6, S7), second switches (S9, S10), a third switch (S8) are provided;

the number of turns of the transmitting coil 2 is changed through second switches (S9 and S10) to adapt to EPP charging and MPP charging respectively;

when the MPP mobile phone is detected, the switch S9 is closed, and meanwhile, the third switch (S8) is closed, and the coil 2 is powered through the full-bridge module 2 and the compensating network module 2;

when the EPP mobile phone is detected, S10 is closed, the coil is switched to normal turns, and different winding coils (coil 1, coil2 and coil 3) are selected through the switches S5, S6 and S7 to charge the mobile phone.

Figure 4:
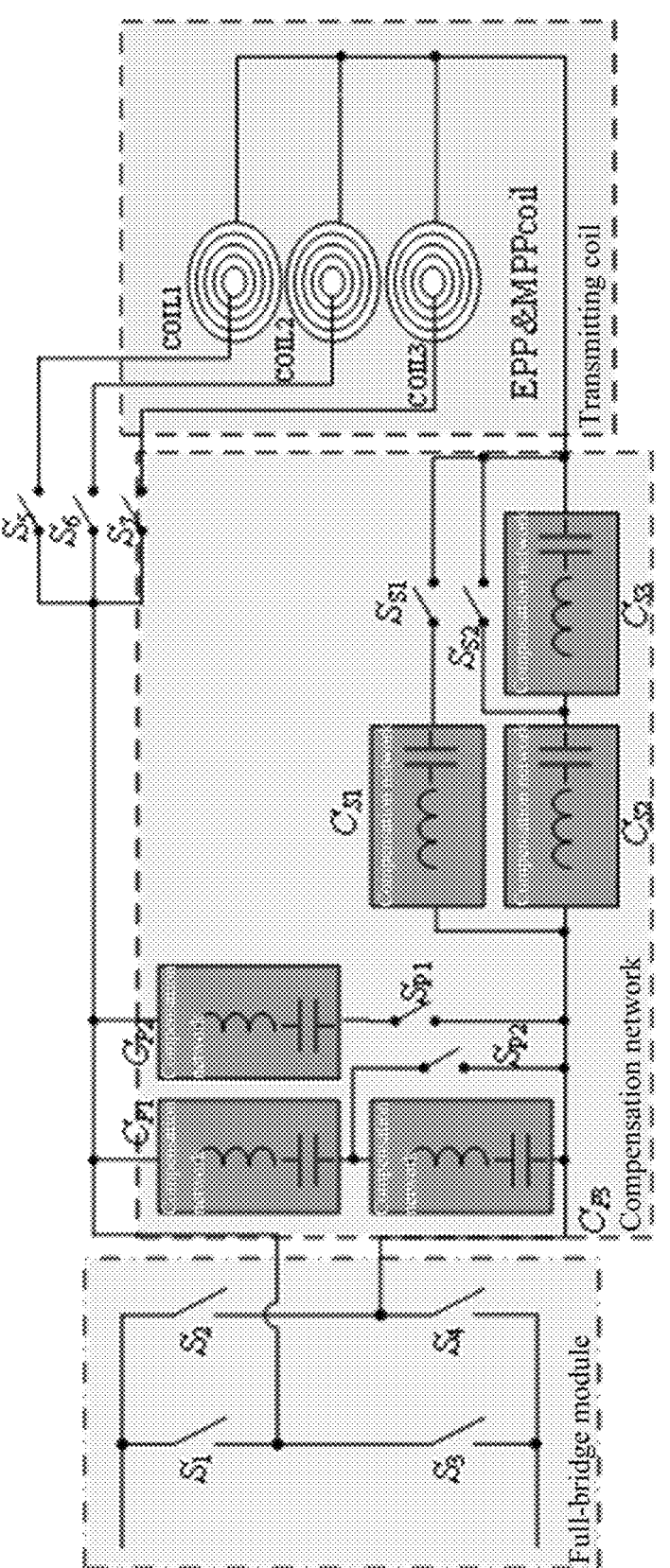
FIG. 4 is a schematic circuit diagram of a first combination of the second mode according to an embodiment of the present disclosure.

As shown in FIG. 4, in a first combination of the second mode, the compensating unit includes a parallel compensating network Cp and a series compensating network Cs, the parallel compensating network Cp is composed of a compensating network Cp1, a compensating network Cp2, and a compensating network Cp3, the series compensating network Cs is composed of a compensating network Cs1, a compensating network Cs2, and a compensating network Cs3, and the compensating network is composed of an inductor and a capacitor; the transmitting coil is a coil which can be compatible with two modes (EPP and MPP) at the same time; switching of different EPP coils is achieved through fourth switches (S5, S6, S7); the fifth switches (Sp 1, Sp 2) and the sixth switches (Ss1, Ss2) are respectively switches of the parallel compensating network module and the series compensating network module, and different compensating networks are adopted corresponding to different protocols;

when the mobile phone is detected to be with EPP protocol, changing the impedance of the compensating network can be used for compensating the transmitting coils (coil 1, coil2, coil 3) of 127 kHz;

when the mobile phone is detected to be with the MPP protocol, the state of the switches Sp1, sp2, Ss1 and Ss2 is changed at the moment due to the fact that the frequency is 360 kHz, and the impedance of the compensating network is changed to be used for matching the coils at this frequency.

Figure 5:
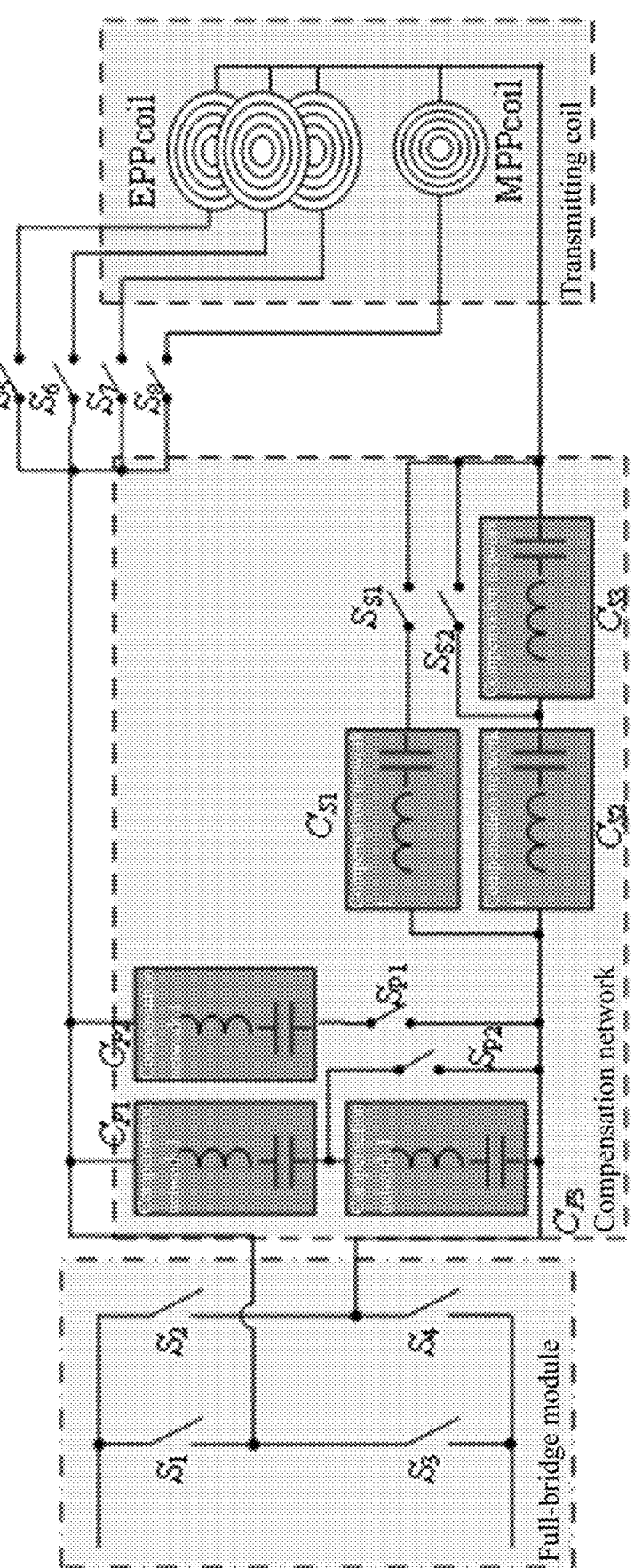
FIG. 5 is a schematic circuit diagram of a second combination of the second mode according to an embodiment of the present disclosure.

As shown in FIG. 5, in a second combination of the second mode, compared to the first combination of the second mode, changes have been made to the transmitting unit: the EPP coil is an EPP standard coil regulated by Qi 1.3, the MPP coil is a magnetic coil, the seventh switches (S5, S6 and S7) are used for switching the EPP standard coil, the eighth switch (S8) is used for switching the MPP magnetic coil, and the ninth switches (Sp1, Sp2) and the tenth switches (Ss1, Ss2) are respectively switches of the parallel compensating network modules and the series compensating network modules;

when the mobile phone is detected to be with EPP protocol, the mobile phone is charged through selecting the switches of S5, S6 and S7;

when the mobile phone is detected to be with MPP protocol, the switch S8 is closed, an MPP coil is selected, and meanwhile, the Sp1, sp2, Ss1 and Ss2 switches are switched to compensate the MPP coil.

Figure 6:
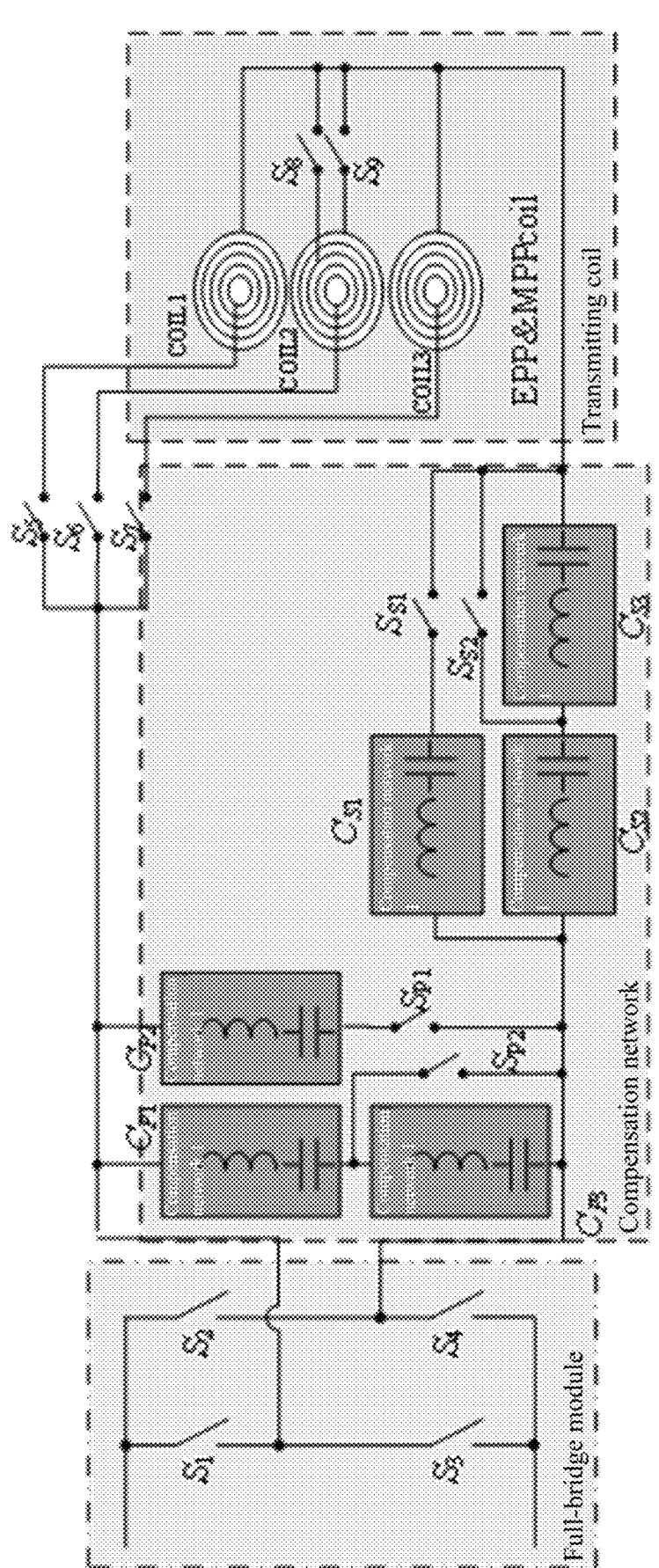
FIG. 6 is a schematic circuit diagram of a third combination of the second mode according to an embodiment of the present disclosure.

As shown in FIG. 6, in a third combination of the second mode, compared to the first combination of the second mode, changes have been made to the transmitting unit: the transmitting coils are standard coils, the eleventh switches (S5, S6 and S7) are used for switching coils coil1, coil2 and coil3, wherein coil2 can change coil inductance by changing coil turns through the twelfth switches (S8 and S9) of the switches, and the thirteenth switches (Sp1, Sp2) and the fourteenth switches (Ss1, Ss2) are respectively switches of the parallel compensating network modules and the series compensating network modules;

when the mobile phone is detected to be with EPP protocol, the switch S9 is closed, and the mobile phone is charged through selecting the switches of S5, S6 and S7;

when the mobile phone is detected to be with MPP protocol, the switch S8 is closed, part of windings of the coil2 are connected into the circuit, and switches Sp1, sp2, Ss1 and Ss2 are controlled to switch to change compensating network parameters so as to match coil impedance, and power transmission is completed.

The foregoing descriptions are merely exemplary embodiments of the present disclosure, but are not intended to limit the present disclosure. Any modification or replacement made by persons skilled in the art within the scope of the technical solutions of the present disclosure shall fall within the scope of protection of the present disclosure.

What is claimed is:

1. A novel vehicle-mounted wireless charging system, comprising a transmitter, wherein the transmitter comprises:

a transmitting unit, composed of a plurality of transmitting coils, a full-bridge unit, used for inverting and modulating signals, and composed of two full-bridge modules, a compensating unit, used for compensating the plurality of transmitting coils and improving a power transmission efficiency, and composed of a plurality of compensating network modules which are each composed of a combination of an inductance and a capacitance; and a selecting unit, used for switching connection between selected ones of the plurality of transmitting coils and selected ones of the plurality of compensating network modules, and composed of a plurality of switches;

wherein the vehicle-mounted wireless charging system has a first mode and a second mode, wherein in the first mode, the two full-bridge modules, two of the plurality of compensating network modules, and the plurality of transmitting coils are selected by switching through the selecting unit such that each full-bridge module is configured to charge different models of mobile phones via respective ones of the plurality of transmitting coils forming a respective EPP quick charging unit and a MPP quick charging unit; and in the second mode, one full-bridge module of the two full-bridge modules, two groups of the plurality of compensating network modules, and the plurality of transmitting coils are selected by switching through the selecting unit such that the one full-bridge module is configured to charge different models of mobile phones by switching connection to a corresponding group of the plurality of compensating network modules and corresponding coils of the plurality of transmitting coil, to change a compensating network impedance and compensate different transmitting coils, so as to charge different models of mobile phones by selectively forming the EPP quick charging unit or the MPP quick charging unit, wherein the two groups of the plurality of compensating network modules comprises a group of parallel compensating network modules and a group of series compensating network modules.

2. The novel vehicle-mounted wireless charging system of claim 1, wherein the plurality of transmitting coils comprise a plurality of EPP coils and an MPP coil;

wherein in the first mode, the one full-bridge module of the two full-bridge modules, one compensating network module of the two compensating network modules, the plurality of switches and the plurality of EPP coils form a proprietary 50 W quick charging unit, the other full-bridge module of the two full-bridge modules, the other compensating network module of the two compensating network modules and the MPP coil form an MPP 15 W quick charging unit, and the proprietary 50 W quick charging unit and the MPP 15 W quick charging unit are independent from each other.

3. The novel vehicle-mounted wireless charging system of claim 1, wherein the plurality of switches comprise a plurality of first switches, two second switches, and one third switch, wherein in the first mode, the plurality of first switches are connected in series with the plurality of transmitting coils in one-to-one correspondence, the third switch is connected with one transmitting coil of the plurality of transmitting coils and the two second switches are connected with the one transmitting coil, and the two second switches correspond to different turns of the one transmitting coil respectively, wherein the one full-bridge module of the two full-bridge modules, one compensating network module of the two compensating network modules, the plurality of first switches and the plurality of transmitting coils form the EPP quick charging unit, and the other full-bridge module of the two full-bridge modules, the other compensating network module of the two compensating network modules, the two second switches, the third switch and the one transmitting coil of the transmitting coils form the MPP quick charging unit.

4. The novel vehicle-mounted wireless charging system of claim 1, wherein the plurality of switches comprise a plurality of fourth switches, a plurality of fifth switches and a plurality of sixth switches, wherein in the second mode, the group of parallel compensating network modules and the group of series compensating network modules each comprise a plurality of compensating networks, the plurality of fourth switches are connected in series with the plurality of transmitting coils in one-to-one correspondence, the fifth switches are connected with the group of parallel compensating network modules, the sixth switches are connected with the group of series compensating network modules, the transmitting coils are able to be compatible with EPP mode and MPP mode simultaneously, wherein when the plurality of fifth switches and the plurality of sixth switches are not closed, the plurality of compensating networks which are not controlled by the plurality of fifth switches and the plurality of sixth switches compensate corresponding coils, the corresponding coils are enabled to charge the mobile phone by selecting corresponding fourth switches of the plurality of fourth switches, such that the EPP quick charging unit is achieved; and when the plurality of fifth switches and the plurality of sixth switches are closed, the compensating network impedance is changed to compensate corresponding coils, the corresponding coils are enabled to charge the mobile phone by selecting corresponding fourth switches of the fourth switches, such that the MPP quick charging unit is achieved.

5. The novel vehicle-mounted wireless charging system of claim 1, wherein the plurality of switches comprise a plurality of seventh switches, a plurality of eighth switches, a plurality of ninth switches, and a plurality of tenth switches, wherein the plurality of transmitting coils comprises a plurality of EPP coils and an MPP coil;

the group of parallel compensating network modules and the group of series compensating network modules each comprise a plurality of compensating networks, the plurality of seventh switches are connected in series with the plurality of EPP coils correspondingly, the plurality of eighth switches are connected in series with the MPP coil correspondingly, the plurality of ninth switches are connected with the group of parallel compensating network modules, the plurality of tenth switches are connected with the group of series compensating network modules, wherein when the mobile phone is detected to be with EPP protocol, the plurality of seventh switches are selected to make the plurality of EPP coils charge the mobile phone, and when the mobile phone is detected to be with MPP protocol, the plurality of eighth switches are closed to make the MPP coil charge the mobile phone, and simultaneously the plurality of ninth switches and the plurality of tenth switches are controlled to be closed to make the group of parallel compensating network modules and the group of series compensating network modules be used for compensating the MPP coil.

6. The novel vehicle-mounted wireless charging system of claim 5, wherein the plurality of EPP coils and the plurality of seventh switches are connected in series in a one-to-one correspondence.

7. The novel vehicle-mounted wireless charging system of claim 6, wherein the MPP coil is a magnetically attractable coil and the plurality of EPP coils are each a Qi 1.3 standard coil.

8. The novel vehicle-mounted wireless charging system of claim 1, wherein the plurality of switches comprise a plurality of eleventh switches, two twelfth switches, a plurality of thirteenth switches and a plurality of fourteenth switches, wherein the group of parallel compensating network modules and the group of series compensating network modules each comprise a plurality of compensating networks, the plurality of eleventh switches are correspondingly connected in series with the plurality of transmitting coils, the two twelfth switches respectively correspond to different turns of one transmitting coil of the plurality of transmitting coils, the plurality of thirteenth switches are connected with the group of parallel compensating network modules, and the plurality of fourteenth network switches are connected with the group of series compensating network modules, wherein when the mobile phone is detected to be with EPP protocol, one of the two twelfth switches is closed, and corresponding eleventh switches of the plurality of eleventh switches are selected to make the corresponding transmitting coils charge the mobile phone, and when the mobile phone is detected to be with MPP protocol, one transmitting coil of the plurality of transmitting coils is closed, the other twelfth switch corresponding to the one transmitting coil is closed, and simultaneously, the plurality of ninth switches and the plurality of tenth switches are controlled to be closed, so that the group of parallel compensating network modules and the group of series compensating network modules are used for compensating corresponding transmitting coils, to make the corresponding transmitting coils charge the mobile phone.

*     *     *     *     *